United States Patent
LeBreton

(10) Patent No.: US 6,660,214 B2
(45) Date of Patent: Dec. 9, 2003

(54) PRESSURE VESSEL MANUFACTURE METHOD

(75) Inventor: Edward T. LeBreton, Mentor, OH (US)

(73) Assignee: Essef Corporation, Chardon, OH (US)

( * ) Notice: Subject to any disclaimer, the term of this patent is extended or adjusted under 35 U.S.C. 154(b) by 86 days.

(21) Appl. No.: 10/079,161

(22) Filed: Feb. 20, 2002

(65) Prior Publication Data

US 2002/0117781 A1 Aug. 29, 2002

Related U.S. Application Data

(60) Provisional application No. 60/271,289, filed on Feb. 23, 2001.

(51) Int. Cl.[7] .......................... B29C 49/64; B29C 70/44
(52) U.S. Cl. ...................... 264/516; 264/257; 264/258; 264/314; 264/327; 264/520; 264/521; 264/570
(58) Field of Search ................................ 264/257, 258, 264/314, 516, 520, 521, 570, 571, 327

(56) References Cited

U.S. PATENT DOCUMENTS

| | | | |
|---|---|---|---|
| 2,977,269 A | 3/1961 | Nerwick | |
| RE25,241 E | 9/1962 | Randolph | |
| 4,133,442 A | 1/1979 | Wiltshire et al. | |
| 4,214,611 A | 7/1980 | Takacs et al. | |
| 4,228,575 A | 10/1980 | Wiltshire et al. | |
| 4,496,517 A * | 1/1985 | Kinoshita et al. | 264/521 |
| 4,518,558 A | 5/1985 | Anway et al. | |
| 4,549,920 A | 10/1985 | Cogswell et al. | |
| 4,595,037 A | 6/1986 | LeBreton et al. | |
| 4,614,279 A | 9/1986 | Toth et al. | |
| 4,636,349 A | 1/1987 | MacLaughlin | |
| 4,637,435 A | 1/1987 | Chirdon | |
| 4,705,468 A | 11/1987 | LeBreton | |
| 4,708,258 A | 11/1987 | Shaw et al. | |
| 4,753,726 A | 6/1988 | Suchanek | |
| D297,560 S | 9/1988 | LeBreton | |
| 4,778,369 A | 10/1988 | Chirdon et al. | |
| 4,785,956 A | 11/1988 | Kepler et al. | |
| 4,799,985 A | 1/1989 | McMahon et al. | |
| 4,818,318 A | 4/1989 | McMahon et al. | |
| 4,828,776 A | 5/1989 | Morel et al. | |
| 4,874,563 A | 10/1989 | McMahon et al. | |
| 4,880,584 A | 11/1989 | Jones et al. | |
| 4,938,823 A | 7/1990 | Balazek et al. | |
| 4,944,887 A | 7/1990 | Fredrick | |
| 4,971,846 A | 11/1990 | Lundy | |
| 4,994,132 A | 2/1991 | Liekens et al. | |
| 5,026,410 A | 6/1991 | Pollet et al. | |
| 5,045,187 A | 9/1991 | Suchanek | |
| 5,091,137 A * | 2/1992 | Ledoux | 264/516 |
| 5,248,721 A | 9/1993 | Dixit et al. | |
| 5,283,029 A | 2/1994 | Ellemor | |
| 5,409,757 A | 4/1995 | Muzzy et al. | |
| 5,526,994 A | 6/1996 | Murphy | |
| 6,168,748 B1 * | 1/2001 | Wang et al. | 264/520 |
| 6,171,423 B1 | 1/2001 | Murphy et al. | |
| 6,485,668 B1 * | 11/2002 | Murphy et al. | 264/516 |
| 6,514,451 B1 * | 2/2003 | Boyd et al. | 264/521 |
| 6,537,483 B1 * | 3/2003 | Cartwright et al. | 264/511 |

* cited by examiner

Primary Examiner—Stefan Staicovici
(74) Attorney, Agent, or Firm—Pearne & Gordon LLP

(57) ABSTRACT

A method of molding a hollow, reinforced molded plastic article. A preform is provided in the shape of the article to be molded. The preform comprises randomly commingled, short lengths of thermoplastic and reinforcing fibers loosely bonded together. A core is provided within the preform and may either be a flexible inflatable core which may be removed later or a thermoplastic liner. The preform is placed in a mold and heated to fuse the thermoplastic while a pressurized liquid coolant is circulated within the core.

16 Claims, 4 Drawing Sheets

PRESSURE VESSEL MANUFACTURE METHOD

This application claims priority of U.S. Provisional Patent Application Ser. No. 60/271,289, filed on Feb. 23, 2001.

BACKGROUND OF THE INVENTION

The invention generally relates to a method of manufacturing hollow, reinforced plastic composite articles, and, more particularly, to a method of cooling a core inserted into a preform for the purpose of manufacturing fiber reinforced pressure vessels for the storage, treatment, and transportation of liquids. According to this invention, the term "core" is meant to include an inflatable rubberized core such as a flexible bag or a plastic liner. This cooling method prevents the deterioration of the inflatable core or the deformation and deterioration of the plastic liner used during the manufacture of the pressure vessel.

Plastic composite articles are becoming increasingly important in a variety of industries, showing many advantages over other materials such as metals and ceramics. Fiber-reinforced plastic composite articles can utilize a number of materials in their composition, including glass, carbon, metal, ceramics, and plastics for reinforcing materials with thermosetting or thermoplastic materials used as binding materials.

Various methods exist for manufacturing reinforced plastic composite articles. The prior art discloses a variety of methods for manufacturing hollow, cylindrical, fiber-reinforced composite articles utilizing both thermosetting resins and thermoplastics for binding reinforcing materials. Many of these manufacturing methods require the heating of a preform of thermoplastic molding fibers and reinforcing fibers, such as glass, while in a rigid mold, to create the finished article. Typically, a plastic liner or rubberized core is installed within the preform, and inflated with a gas while the preform is being heated in the mold to fuse the thermoplastic. As the preform is heated, the core or liner is used to maintain the shape of the preform, and urge the preform against the mold wall. The liner or core then defines the interior shape of the preform.

In some cases, it is desirable that the core be partially or completely bonded to the interior of the preform and thus become part of the finished article, providing a special interior surface. In other cases, the core is removed from the article after the article is cooled, whereby the core may preferably be reused.

However, since the preform within the mold may need to be heated to relatively high temperatures, such as 300 or more degrees F., sometimes for 30 or more minutes when the binding material is a thermoplastic resin, the core may undergo undesirable transformations due to the heating process.

For example, if an inflatable rubberized core is used, such as a neoprene or silicone rubber bladder, the heating process within the mold may lead to a deterioration of the core. The core may become brittle, less-resilient, and deformed. If the core is to be removed from the finished article and reused, it will show a reduced life cycle and is more prone to failure during use, thus increasing the risk of a faulty finished article. If the core is to become a part of the finished article, it may gain undesirable properties (such as deformation, brittlization, material transformation, etc.) due to the effects of heating the core.

A similar situation occurs when a plastic liner is used in the interior of the article. Since it is often desirable that the plastic liner be of a similar thermoplastic resin material as the finished article, the liner will soften and lose its shape as the preform is heated. The heat will tend to soften and melt the liner, even if the liner is pressurized to maintain its shape. However, that softening and melting may lead the liner resins to intermix with the preform and be absorbed, so that the properties of the special lining are lost.

It would be desirable to provide a method to prevent these deleterious effects on the inflatable rubberized cores and plastic liners in the manufacture of plastic composite pressure vessels.

SUMMARY OF THE INVENTION

This method and device provides a cooling means for the interior of a hollow, reinforced plastic composite article while simultaneously pressurizing the interior of the article during a heating process. This is done by providing a back pressure valve on a pressure outlet line of the core and using a fluid such as water to circulate through the liner to pressurize and cool the core contained in the interior of the article. This helps keep the interior of the article cool and preserves the life and condition of the inflatable core while the article is being heat treated. This method can also be used to pressurize and cool a liner or similar component of article during heat treating, consolidation, or cure of the article.

DETAILED DESCRIPTION OF THE INVENTION

This cooling method and device is useful in the manufacture of hollow, reinforced plastic composite articles made up of a matrix of reinforcing fibers intimately intermixed with a binding resin, such as a thermoplastic resin. Prior art manufacturing methods are disclosed by U.S. Pat. Nos. Re. 25,241; 4,446,092; 4,504,530; 2,848,133; 3,874,544; 3,508, 677 and 3,907,149. However, this invention is not limited to these manufacturing applications, but would also be useful whenever it would be beneficial to cool the interior of a plastic composite article during the heating, curing, or heat treating phase of its manufacture.

The invention is particularly useful for cooling a rubberized core or plastic liner inserted within a preform in order to prevent the deterioration of the core or the liner due to the heating, curing, or heat treatment of manufacture. The invention could also be used to cool a rubberized core contained with a plastic liner contained within the preform. The invention allows the core to be removed and reused more often, thus reducing manufacturing costs by increasing the life of the core, and, alternatively, to preserve the useful features of the core or liner in the finished product, if the core or liner is to be an integral part of the finished article.

Figure 2:
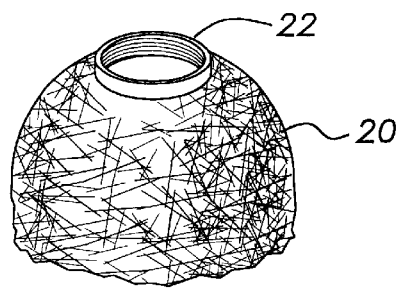
FIG. 2 is a perspective view of a separate top dome portion of the preform of FIG. 1.
Figure 1:
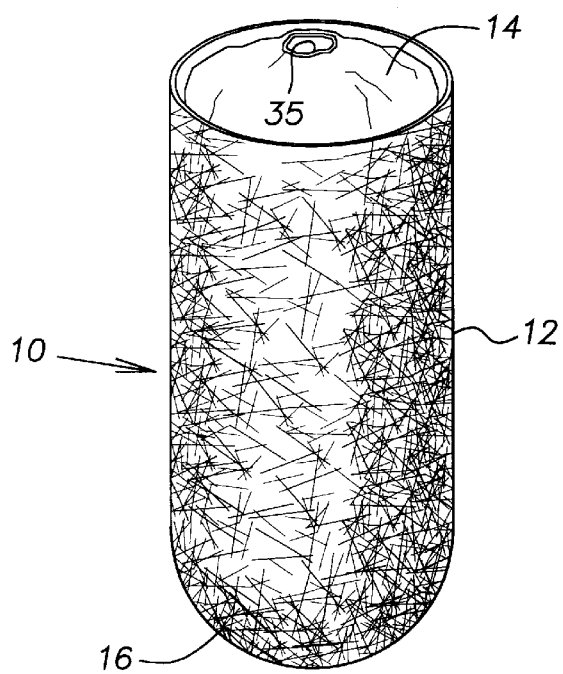
FIG. 1 is a perspective view of a cylindrical sidewall portion and an integrated bottom dome portion of a preform.

FIGS. 1 and 2 show the preform 10 according to one aspect of the invention. The preform 10 may be manufactured by employing the apparatus set forth in U.S. Pat. No. 4,101,254, incorporated herein by reference. The thermoplastic and reinforcing fibers are cut and simultaneously dispersed in commingled form onto a vacuum supplied screen, and either sprayed with a resin or briefly heated to bind the fibers together loosely into the shape of the preform. A top dome preform 20 is formed by simultaneously dispersing commingled thermoplastic and reinforcing fibers on a concave screen corresponding to the shape of the dome preform 20. The fibers are held on the screen by a vacuum and either sprayed with a resin or briefly heated to bind the fibers together loosely into the shape of the dome preform.

The preform 10 of FIG. 1 has a cylindrical sidewall portion 12 with an integrated domed bottom portion 16, and utilizes the separate domed top preform 20 of FIG. 2. The top dome preform 20 is provided with a threaded fitting 22 integrated into the top domed portion of the preform, for example. The fitting 22 has a neck portion 21 and a radial extending flange 23. Alternatively the fitting or fittings can be assembled or manufactured with other preform components or fittings while loading the mold, as described herein below. These fittings may be manufactured by injection molding from a compatible thermoplastic resin composite, for example, or the fittings may be manufactured by some other method and/or be comprised of other materials, such as metals, plastics, composites, ceramics, and glasses, for example.

Figure 3:
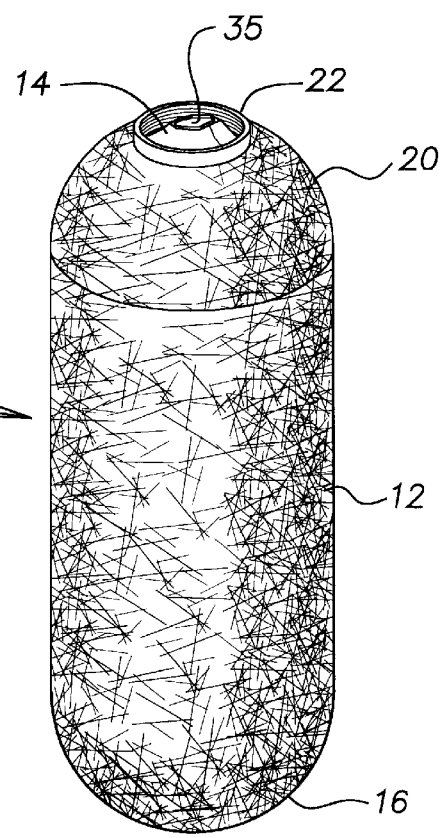
FIG. 3 is a perspective view of a filly assembled preform.

According to one aspect of the invention, the preform is manufactured with an inflatable rubberized core 14 inserted into the preform with a nozzle 18 for connecting to a source of pressure. The rubberized core could be comprised of a material such as neoprene or silicone rubber. FIG. 1 shows the inflatable core 14 inserted in the preform, with a nozzle 18 adapted for connecting to a pressurized air source. FIG. 3 shows the core 14 already installed into a fully assembled preform 10. The inflatable core 14 will define the interior shape of the finished article.

According to another aspect of the invention, the preform is manufactured with a thermoplastic liner as the core. The liner is manufactured by blow molding, injection molding, rotational casting, or some other technique. This liner will then define the interior shape of the finished article, and can provide a resin-rich interior surface in the finished article to minimize wicking of liquids or fluids through the container wall, as discussed in U.S. Pat. No. 4,446,092, for example. As a further alternative, the thermoplastic liner could be fabricated from a thermoplastic film. According to still another aspect of the invention, a rubberized inflatable core is placed inside a plastic liner contained within the preform.

The preform is composed of a thermoplastic resin material and a reinforcing material. The thermoplastic resin is used to bind the reinforcing fibers together and provide a matrix for the reinforced finished article. The thermoplastic resin may be polypropylene, for example, and could be in a chopped, fiber, or particulate form. Other thermoplastic resins can also be used, such as polyethylene, polybutylene terephthalate, polyethylene terephthalate, or nylon, among others. The reinforcing material is typically a chopped fiber comprised of glass, carbon, Kevlar, metal, or some other reinforcing material or combinations thereof.

The fiber to resin ratio is optimally chosen for durability, workability and strength, considering the specific use of the finished product. The ratio of reinforcing fiber to thermoplastic material may be constant, or the ratio may vary throughout the preform in some manner, for example along its length, through its thickness, or among the various fittings, depending on the desired properties of the finished article. A typical preform has a constant ratio of reinforcing fiber to thermoplastic resin of about 3:2.

The choice of thermoplastic binder matrix and its form depends on the desired properties of the finished article, the desired method of manufacturing the preform, the workability requirements of the preformed and molded articles, and the cost of the available raw materials. The optimum reinforcing material is chosen based on similar considerations.

FIG. 3 shows a fully assembled preform according to an aspect of the invention as it may appear before undergoing the heat treatment in the mold. According to one aspect of the invention shown in FIG. 4, the fibers in the preforms of FIGS. 1, 2, and 3 are typically loosely held together and are not yet bound in a matrix. The length of the fibers is chosen to provide desirable properties in the finished product and for easy workability of the preform or the formed article. The fibers may all be of a similar length, or the fiber lengths may be varied according to the specific properties desired. Thermoplastic fibers of approximately two inch lengths combined with reinforcing fibers of approximately one inch lengths have proven to provide acceptable properties for many preforms, formed articles, and typical manufacturing techniques.

The preform thickness may be substantially constant or vary, for example, along the length of the preform, or among the various components or fittings, according to the requirements and the desired properties of the particular finished article.

Figure 4:
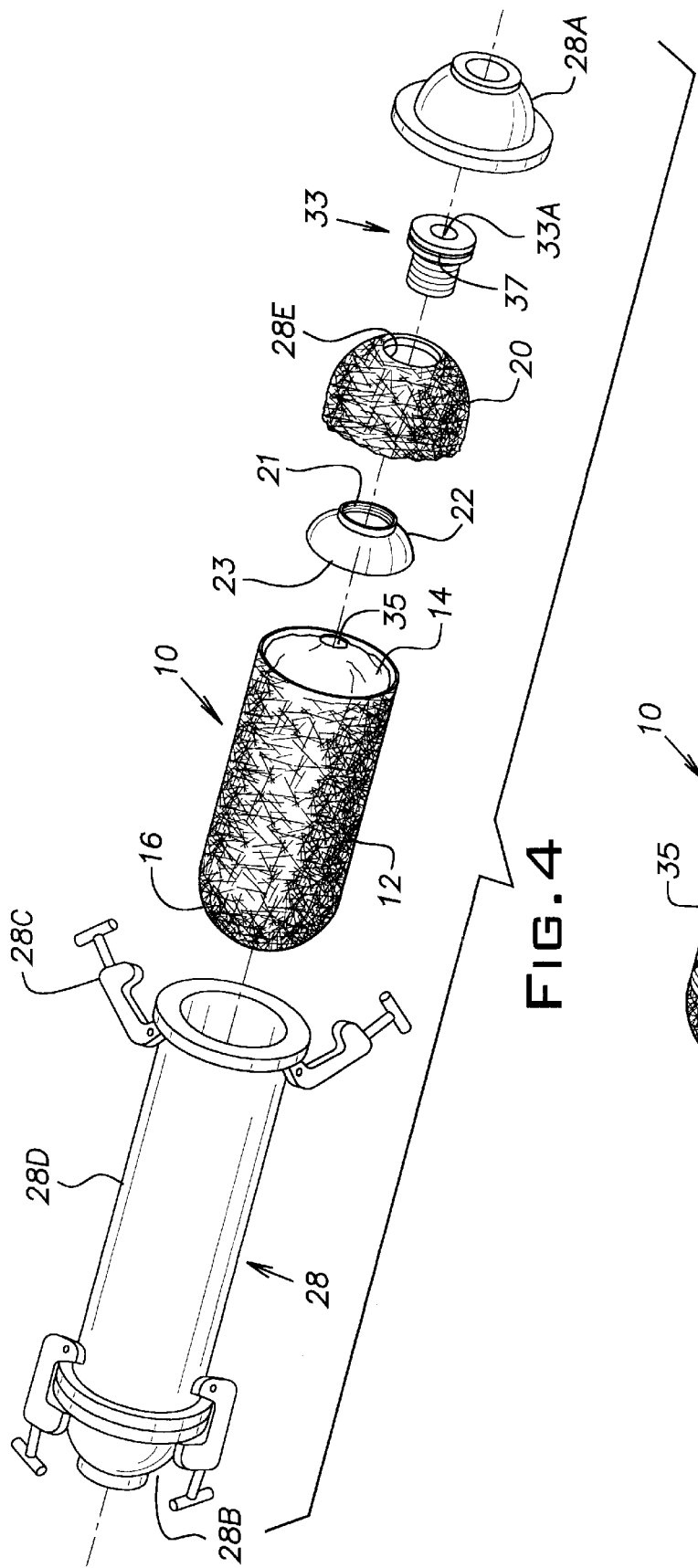
FIG. 4 is an exploded view of a rigid mold arrangement showing a preform about to be inserted into the mold.

Referring now to FIG. 4, a cylindrical mold 28 comprises a bottom mold head 28B, a top mold cup 28A, and a tubular body 28D. The heads 28A and 28B are clamped to the body 28D by pivoted claims 28C. With the top mold head 28A removed, the preform 10 is inserted into the mold 28 and the core 14 is inserted within the preform 10. The fitting 22, the top preform 20, the top mold cap 28A and a threaded core 33 are pre-assembled by inserting the threaded core 33 into an opening 28E in the top preform 20 and threading the core into the fitting 22 while sandwiching the top preform 20 between the fitting 22 and the top mold head 28A. The rubberized core 14 is fused to a nut 35 and the nut 35 is threaded onto the core 33 to capture the rubberized core 14 between the nut 35 and the fitting 22 (see FIG. 5). The pre-assembly is then placed within the preform 10. The clamps 28C are then clamped to the head 28A.

The rigid mold defines the outer shape of the finished article. The inflatable core 14 defines the interior shape of the finished article. If a reusable inflatable core is used, such that it will be removed from the molded article, the core 14 may be treated with a releasing agent before or during assembly in the mold to aid in its removal. Alternatively, if the core 14 is to become integrated with the finished article, it may be treated with an adhesive agent to aid in its bonding to the interior of the molded article.

Figure 4A:
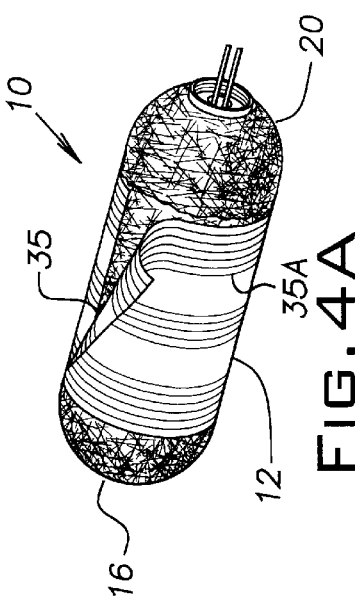
FIG. 4A is a preform wrapped with a unidirectional reinforcing mat.

As may be seen in FIG. 4A, the preform 10 may be wrapped with a reinforcing mat 35 having circumferential reinforcing fibers 35A therein to supply added hoop strength to the molded article.

Figure 5:
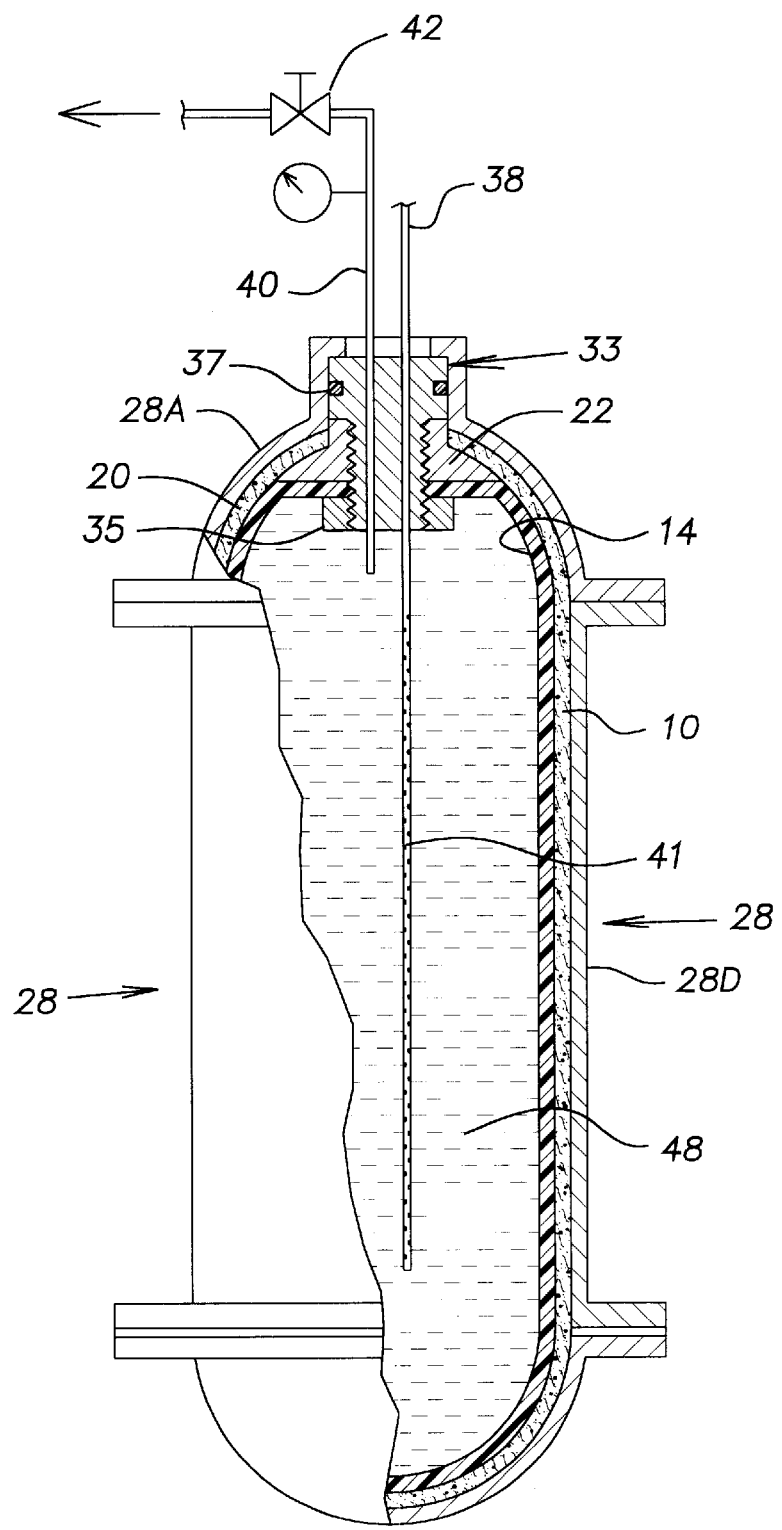
FIG. 5 is a fragmentary elevational view of the rigid mold of FIG. 4 during a molding operation employing a flexible core.

FIG. 5 shows a preform 10 contained within the rigid mold 28 of FIG. 4. The preform 10 is viewable through a cut-away portion of the mold for illustration. The core 14 is a rubber bladder capable of being pressurized with a fluid or liquid without leaking. The threaded core 33 has an 0 ring 37 installed therein such that a tight seal is created between the mold cap and the threaded core 33. An input pipe 38 and an output pipe 40 penetrate the threaded core 36. The input pipe 38 extends through the core 33 and contains holes 41 for distributing a cooling fluid 48 such as water within the flexible core 14. The fluid 48 is circulated throughout the core 14 sufficient to cool the core while the mold 28, and hence the preform contained within the mold, is being heated to melt and distribute the binder throughout the reinforcing fibers. The fluid 48 is also used to pressurize the core sufficient for inflating the rubberized core. Water at a tap temperature of between about 45 and 60 degrees F., pressurized to between about 10 and 80 psi, has proven effective as the cooling fluid for this application, but other fluids at similar temperatures and pressures would also be effective as alternatives, with the higher pressure limited by the capability of the rigid mold to withstand the higher pressure. The fluid 48 exits the flexible core via output pipe 40. A back pressure valve 42, installed on pipe 40, keeps the core of the preform pressurized to the required amount.

The preform is heated within the mold 28 at temperatures of up to about 400 degrees F. or more using such heating means as hot air convection, flame treatment, infrared radiation, an oven, resistance heaters embedded in the mold, or some other heating method. The cooling fluid 48 simultaneously cools the interior of the preform and pressurizes the interior of the article, and provides any necessary pressure to aid in the manufacture of the article. The pressure compresses the preform 10 in the mold 28 and aids in the distribution of the thermoplastic resin material throughout the reinforcing fibers to form a reinforcing fiber/resin matrix and to reduce voids within the finished product.

As an alternative, the invention may be implemented by having the input pipe 38 and the output pipe 40 connected to opposite ends of the preform with separate fittings. Thus, one end of the preform would be connected to the source of the cooling fluid, while the other end would be connected to the exhaust.

Figure 5A:
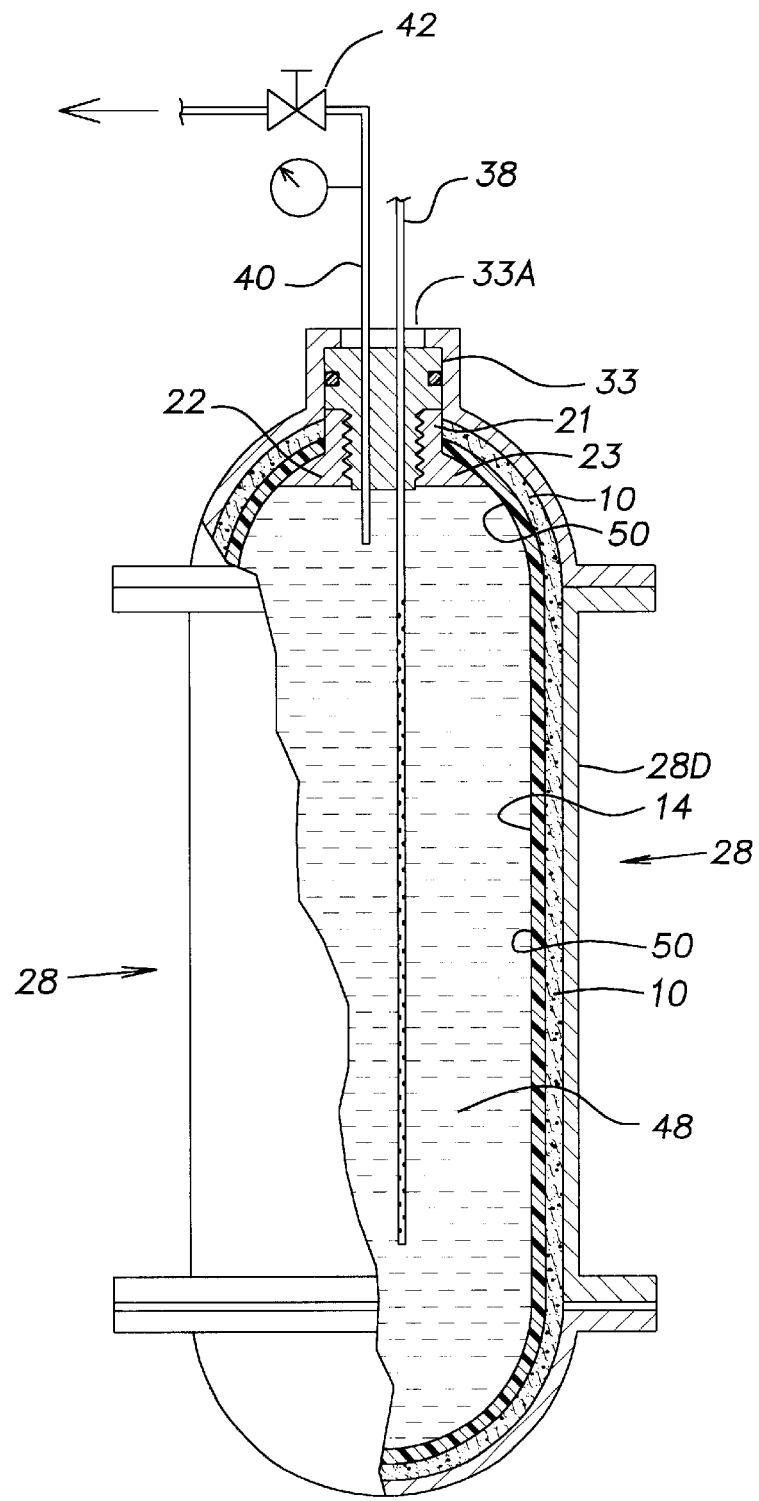
FIG. 5A is a fragmentary elevational view of the rigid mold of FIG. 4 during a molding operation using a plastic liner.

Referring now to FIG. 5A a thermoplastic liner 50 is employed as a core. The liner 50 may be produced by blow molding, injection molding, rotational casting or other molding techniques. The fitting is molded into the liner during the molding process of the liner and may be considered integral therewith. The molding operation is conducted in the manner previously described in reference to FIG. 5.

The invention has been described using specific examples; however, it will be understood by those skilled in the art that various alternatives may be used and equivalents may be substituted for elements described herein, without deviating from the scope of the invention. Modifications may be necessary to adapt the invention to a particular situation or to particular materials without departing from the scope of the invention. It is intended that the invention not be limited to the particular implementation described herein, but that the claims be given their broadest interpretation to cover all embodiments, literal or equivalent, covered thereby.

What is claimed is:

1. A method of molding a hollow, reinforced molded plastic article comprising the steps of:

providing a preform in the shape of the article to be molded, said preform comprising randomly commingled, short lengths of thermoplastic and reinforcing fibers loosely bonded together and having an inside surface and an outside surface;

providing a core having an inside surface and an outside surface;

positioning said core within said preform so that the outside surface of said core contacts the inside surface of said preform;

positioning said preform within a closed mold so that the outside surface of said preform contacts an inside surface of said mold;

circulating a pressurized liquid coolant within said core to cool said core while heating said mold to a temperature sufficient to fuse said thermoplastic fibers into a coherent matrix substantially free of voids with said reinforcing fibers randomly oriented and distributed therein;

cooling said mold to a temperature sufficient to solidify said matrix; and removing said plastic article from the mold.

2. A method of molding a hollow reinforced molded plastic article according to claim 1 wherein the liquid coolant is water.

3. A method of molding a hollow reinforced molded plastic article according to claim 2 wherein said water is at a temperature of between about 45 and 60 degrees F.

4. A method of molding a hollow reinforced molded plastic article according to claim 3 wherein the fluid is pressurized to a pressure of between about 10 and 80 psi.

5. A method of molding a hollow reinforced molded plastic article according to claim 1 wherein the thermoplastic fibers are polypropylene and the reinforcing fibers are glass.

6. A method of molding a hollow reinforced molded plastic article according to claim 1 wherein said core is an inflatable rubberized core and is removed from said molded plastic article.

7. A method of molding a hollow reinforced molded plastic article according to claim 1 wherein said core is a plastic liner.

8. A method of molding a hollow reinforced molded plastic article according to claim 1 wherein said mold is heated to a temperature of about 400° F. to fuse said thermoplastic fibers.

9. A method of molding a hollow, reinforced molded plastic article comprising the steps of:

providing a first preform having a cylindrical sidewall defining an open mouth and a dome-shaped bottom wall;

providing a second dome-shaped preform having an axial opening therein;

said first and second preforms comprising randomly commingled, short lengths of thermoplastic and reinforcing fibers loosely bonded together and having an inside surface and an outside surface;

inserting said first preform into a cylindrical mold having a mold surface corresponding to the outside surface of said first preform;

inserting a core within said first preform;

inserting a neck portion of a threaded fitting through said axial opening so that a flange portion of said fitting bears against the inside surface of said second preform;

threading a threaded core having an annular flange into said threaded fitting so that said annular flange contacts the neck portion of said threaded fitting;

providing a mold cap having an axial bore and having a mold cavity corresponding to the outside surface of said second preform;

placing said second preform against the mold cavity of the mold cap;

attaching said mold cap to said cylinder mold;

circulating a pressurized liquid coolant within said core to cool said core while heating said cylindrical mold and mold cap to a temperature sufficient to fuse said thermoplastic fibers into a coherent matrix substantially free of voids with said reinforcing fiber randomly oriented and distributed therein;

cooling said cylindrical mold and mold cap to a temperature sufficient to solidify said matrix; and removing said plastic article from the mold.

10. A method of molding a hollow reinforced molded plastic article according to claim 9 wherein the liquid coolant is water.

11. A method of molding a hollow reinforced molded plastic article according to claim 10 wherein said water is at a temperature of between about 45 and 60 degrees F.

12. A method of molding a hollow reinforced molded plastic article according to claim 11 wherein the fluid is pressurized to a pressure of between about 10 and 80 psi.

13. A method of molding a hollow reinforced molded plastic article according to claim 9 wherein the thermoplastic fibers are polypropylene and the reinforcing fibers are glass.

14. A method of molding a hollow reinforced molded plastic article according to claim 9 wherein said core is an inflatable rubberized core and is removed from said molded plastic article.

15. A method of molding a hollow reinforced molded plastic article according to claim 9 wherein said core is a plastic liner.

16. A method of molding a hollow reinforced molded plastic article according to claim 9 wherein said mold is heated to a temperature of about 400° F. to fuse said thermoplastic fibers.

* * * * *

UNITED STATES PATENT AND TRADEMARK OFFICE
CERTIFICATE OF CORRECTION

PATENT NO. : 6,660,214 B2
DATED : December 9, 2003
INVENTOR(S) : Edward T. LeBreton It is certified that error appears in the above-identified patent and that said Letters Patent is hereby corrected as shown below:

<u>Column 5,</u>
Line 1, delete "has an 0 ring" and insert -- has an O ring --.

Signed and Sealed this

Ninth Day of March, 2004

JON W. DUDAS
*Acting Director of the United States Patent and Trademark Office*